United States Patent Office 3,257,267
Patented June 21, 1966

3,257,267
RETARDING LIBERATION OF AN ADDITAMENT IN FORMING A FIBROUS WEB BY EMBEDDING THE ADDITAMENT IN A GEL MATRIX PRIOR TO ADDITION TO THE FIBERS
Harold R. Hay, Washington, D.C.
(795 Roble, Menlo Park, Calif.)
No Drawing. Filed May 19, 1965, Ser. No. 457,162
10 Claims. (Cl. 162—159)

This application is a continuation-in-part of my copending application Serial No. 216,031, filed August 10, 1962 now abandoned.

The present invention relates to the incorporation of organic and inorganic additaments to fibrous materials such as webs, felts, mats, sheets, boards, and other aggregates of oriented and unoriented fibers and filaments of lignocellulose, cellulose, cellulosic derivatives, plastic, leather, wool, hair, glass, ceramics, etc.

The art of incorporating additaments to fibrous products which are organic, inorganic, or bends of inorganic and organic materials has been extensively developed for a variety of purposes, such as bonding, filling, coating, etc. or for contributing such properties as resistance against insects and decay, water repellance, fire retardance, and other desirable properties. The additaments have been in the form of dry particles, gases, solutions, emulsions, hydrous dispersions, hot melts, etc. They have been applied to the individual fibers; to gaseous or liquid suspensions of the fibers; to webs, felts, sheets, boards, and other forms into which the fibers may be processed as intermediate or final products; and they have been disposed either integrally or on the surface of said products.

Similarly, the art of retaining additaments has been examined from the viewpoints of mechanical entrapment associated with particle size of the additament; size, distribution and defibrillation of the fibrous material; consistency and viscosity in the suspension medium; density of the web, felt, sheet, or board; and the like. Various methods improve retention of additaments by chemical reactions through precipitation, coagulation or conversion of one or more of the additaments. Deposition by crystallization, evaporation of a solvent, or cooling of a hot melt are practiced; and complicated physico-chemical methods, involving natural surface charges of positive or negative character or those induced by water-soluble cationic or anionic agents, are known.

A considerable use is made of collageneous materials, gums, starches and other natural products for retention of additaments as well as the use of synthetic or modified chemicals, of both organic and inorganic nature, having hydrophilic properties similar to the natural glues, gums and starches or having hydrophobic properties such as greases which nonetheless promote adhesion through tackiness or like characteristics. In many processes, including those to be subsequently specified, none of these materials and methods singly nor in combination with the others mentioned has heretofore been wholly successful in use to provide the desired retention of additaments.

The results have been least satisfactory when applied to the retention of fire-retardant salts, toxicants and humectants of the water-soluble type and more particularly when these soluble additaments, or even water insoluble types, are to be added to the fibers while they are in aqueous suspension prior to the formation of a web, mat, sheet or board. Under these conditions, great losses of the additament have resulted when the aqueous suspension medium was drained, drawn or pressed from the mixture of fibers and additaments. These additaments introduced by methods of prior art frequently interfere with the drainage of water from a water-laid sheet thereby slowing the rate of production.

I have found it advantageous, as hereafter described in more detail, to incorporate the additament in a protective matrix of thick gel, to particulate the gel-embedded additament, to add the small particulated masses to a fiber suspension shortly before removing water from the suspension to form a water-laid sheet, to form a wet web containing said small particulate masses without substantially distorting their shape, to apply super-atmospheric pressure in the usual manner to both force out additional water and to shear and spread the small particulate masses so as to greatly increase their surface area and to reduce the protective action of the gel matrix and to more widely distribute the additament, and thereafter to dry the sheet. The small particulate masses are produced in a manner causing them to possess such high viscosity that they do not substantially flow or coalesce except at super-atmospheric pressures and are of such size that they do not readily pass through the interstices of the fibrous web nor large enough to exceed the thickness of the wet web in which they are contained; and the protective action of the gel matrix of the particulate masses is so adjusted that it retards the liberation of the additament until the application of super-atmospheric pressures has sheared and thinly spread the particulate masses.

A typical flowsheet for my process follows:

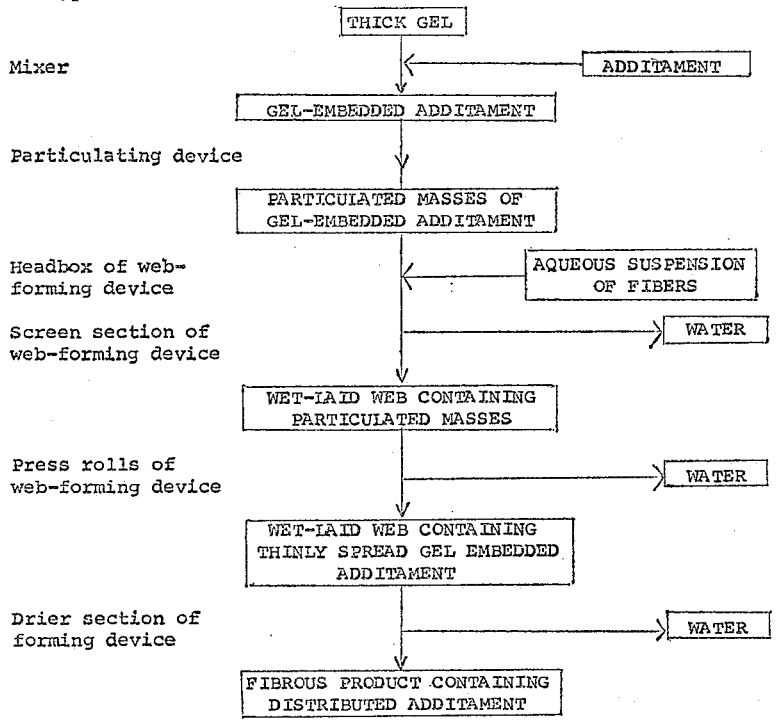

It is the primary objective of the present invention to provide a method for the improved application of additaments to be incorporated into fibrous organic and inorganic materials being formed into webs, felts, mats, sheets, boards, and similar oriented or unoriented forms.

It is an object of this invention to improve the retention and distribution of said additaments in said products.

Another object of this invention is to improve the retention of water soluble additaments in products formed by wet process methods in which the additaments and fibers are temporarily suspended in an aqueous medium.

Still another object of this invention is to provide an improved method for producing fire-retardant products of fibrous organic materials.

It is also an object of this invention to provide a method for improving the bacteriostatic and fungus resistant properties of fibrous organic materials.

It is an added object of this invention to provide an improved method for retaining humectants in fibrous organic products.

It is a further object of the present invention to provide an improved method for retaining resins, adhesives, plasticizing agents, waxes, waterproofing agents, fillers, pigments and like materials in organic or inorganic fibrous products or in blends of these.

It is also an object to provide improved products by means of the processes to be described and specifically to provide improved stiffness in a corrugated carton.

It is an additional object of the invention to provide simpler means of lower cost for incorporating additaments in fibrous products.

Further purposes of this invention will be apparent from following descriptions.

Considered from one aspect, the present invention relates to an improved process for distributing an additament in a fibrous felt which comprises the steps of:

(a) preparing an aqueous suspension of fibers, (b) adding to said aqueous fiber suspension a plurality of small particulate masses consisting of an additament embedded throughout a protective matrix of gel, (c) subjecting said admixture to water removal steps including contact with a filtering means, (d) forming a wet web containing said small particulate masses without substantially distorting their shape, (e) thereafter subjecting the wet web to superatmospheric pressure to both remove further amounts of the aqueous suspending medium and to shear and spread the small particulate masses so as to greatly increase their surface area, to reduce the protective action of the gel matrix, and to more widely distribute the additament, and (f) drying said web containing said distributed additament, (g) said small particulate masses being of such viscosity as not to substantially flow or coalesce except at superatmospheric pressures, (h) said small particulate masses being large enough so that they will not readily pass through the interstices of the fibers comprising the wet web and through the filtering means and small enough that they do not exceed the thickness of the wet web to be produced, (i) the protection afforded by the gel matrix being sufficient to avoid substantial liberation of the additament prior to step (e).

The term "additament" is used in the present specification and claims as the broad and proper generic term for any non-fibrous substance that may, by the processes of the present invention, be incorporated in the fibrous material. The term includes such diverse materials as substances soluble or substantially insoluble in water or organic solvents, hydrophilic and hydrophobic gels, binding agents, elastomers and resins of the thermosetting or thermoplastic types, loading, filling and coloring materials and materials of technical utility as water repellants, flame retardants, preservatives, substances repellent or toxic to insects, anti-tarnish or anti-skid agents and substances of various types even including subdivided metals.

From the detailed description to follow, it will be apparent that there is substantially no limitation to the types of additaments which may be incorporated into fibrous materials by the present invention. Similarly, the amount of any one of the additaments in proportion to the fibers, filaments or fibrous mass may vary over an extremely wide range from as little as 0.01% up to 90% or more depending upon the purpose for which it is added and its compatability in that amount with processes involved.

Hydrophilic substances have previously been used for a variety of purposes in combination with various additaments incorporated into fibrous products. Thus it is known that galactomannans, starches, alginates, sodium carboxymethyl cellulose, polyvinyl alcohol, sodium silicate and other materials forming aqueous gels have been used for their own ability to increase the strength of paper or to facilitate the incorporation of other gums or synthetic resins. They have likewise been used to improve the retention of sizing materials, fillers, pigments and toxicants in paper and products such as insulating boards. In the prior art, the hydrophilic substances have been introduced in a highly dispersed state substantially coating the fibers in advance of the formation of the web. This procedure causes other additaments to adhere to the tacky hydrophilic coating present on the fibers but it also causes the interstices between the fibers to be plugged by the gel in a manner which retards drainage of water from the forming web.

The gel-forming materials also have been used as protective colloids to retard the agglomeration of colloidal particles, such as metals reduced from metallic salts; and it has been disclosed that the copper salts of some hydrophilic substances, such as carboxymethyl cellulose, have toxic properties capable of preserving fibrous organic materials. In these cases, it also has been the intent to have the colloidal particles and the protective colloid in a highly dispersed state prior to the formation of the wet web in which they are to be retained.

Hydrophilic, gel-forming compounds have furthermore been extensively used in coating formulations, such as paints, where, in addition to a binding action, they serve as suspending agents, thickeners, flow regulators and the like and they may be made relatively thioxotropic which provides additional advantage to some applications. These coating materials have been applied to the surfaces of paper, insulation boards, hardboards, wood particle boards, fabrics, textiles and other organic fibrous materials as well as to mineral wool, fiberglass and similar inorganic materials. It is also known that wood preservatives and fire retardants have been mixed with such hydrophilic materials and coated onto wood or other fibrous products to protect the same against mildew and decay organisms or against destruction by fire. Furthermore, it is known that in pharmaceutical preparations such hydrophilic gels have been used to control the solubility of materials; in some cases the swelling action has caused disintegration of a medicament to small size so that it may be more readily dissolved, while in other cases it has retarded the solubility of materials by swelling to form a protective coating.

Encapsulated additaments have been applied to paper in the prior art as disclosed in United States Letters Patent No. 3,041,288, issued to William Henry Anthony who encapsulated liquid additaments by the process of coacervation. To distinguish this prior art, reference is made to the definition of coacervation as given in The Encyclopedia of Chemistry, by Clark and Hawley (1957): "Coacervation might, therefore, be defined as partial miscibility of optically isotropic liquids in which at least one of the liquids consists of two constituents both of which are in the liquid state." As indicated by Anthony, the gelled hydrophilic colloid is "deposited on the drops" and it "makes strong walls around them" the resulting capsules being "of the order of one to three microns in diameter" and with the "wall material eliminating the tendency of the capsules to aggregate when dispersed in a liquid." While other art includes agglomeration of such coacervated capsules, the art of coacervation is basically limited to depositing relatively rigid walls onto microscopic droplets of liquids under complicated and precisely controlled chemical, physical and mechanical conditions. The one to three micron size is so small that excessive losses would result when forming a wet-laid sheet and the capsules entrapped in the sheet would, in large part, rest in the interstices between two fibers which would take the pressure of the press rolls and, in many cases, prevent the rupturing of the capsule wall and the release of the additament. The capsule wall of prior art is hardened and strengthened and is, itself, not changed in thickness by the application of pressure but, rather, ruptures to release the additament.

What I have found as new and useful is the application of hydrophilic colloids in processes where they control the rate of solution under adjusted conditions to make possible new and economic products. Additionally, I have found that by controlling certain properties of the gel and of a combination of the gel and other additaments, I am able to carry out processes involving fibrous materials more successfully than has been done in the prior art as will be more specifically described herein. Furthermore, I have found that hydrophilic colloids can, by regulation of the pore size of the gel, control the particle size and composition of toxic substances formed in situ within the gel thereby increasing their toxicity while simultaneously improving the retention and distribution of the toxicant in the fibrous product. I have also found that the use of such hydrophilic gel-forming materials permits additaments of a great variety of types to be added to fibrous materials by means of devices not hitherto used for the purpose; all as will now be described in detail.

By reason of the importance of the present contribution to various fabricating arts, it will be necessary to utilize a number of diverse examples so that the true generic nature of the invention will be properly evaluated and the generic claims hereunto appended will be supported by sufficient data to warrant them. For convenience, the embodiments of the invention have been separated into several categories.

A. ADDITAMENTS COMPRISING A GEL-EMBEDDED SOLUBLE SALT

In the following example, fire-retardant salts will be used as one type of water-soluble additament which may be gel-embedded and applied by my process.

Sodium silicate with mineral additives was one of the first successful fire-retardant coatings—it seemingly acted through intumescence, insulation, and exclusion of oxygen. The most successful fire-retardant chemicals, however, have been mono ammonium phosphate, diammonium phosphate, ammonium sulfate, ammonium sulfamate, borax, boric acid, and zinc chloride. The ammonium phosphates retard both flaming and afterglow. Borax and boric acid are frequently used in combination since the borax best retards flaming while boric acid is most effective against afterglow. The ammonium salts appear effective owing to their decomposition to a gas (ammonia), which dilutes the combustible gases of the organic material, and to their acid residues which promote the formation of charcoal rather than of combustible gases and tars. The zinc chloride releases hydrochloric acid in gas form. Borax, having ten molecules of water of hydration, is capable of thermal absorption which may account in part for its action; it tends to intumesce or to provide a coating as another part of its effectiveness; and, as a salt of a strong base and a weak acid, it may function in a chemical manner not yet clear but apparently typical of such salts or of salts of weak bases and strong acids of the ammonium phosphate, sulfate and sulfamate type. The glow retardants, such as boric acid and the phosphoric acid residue of ammonium phosphates, apparently alter the ratio of production of carbon monoxide to carbon dioxide in favor of the monoxide which is evolved by a less exothermic reaction thereby reducing combustion.

The great difficulty in using the above-mentioned fire retardant salts is their great water solubility; this causes them to be less valuable for exterior applications subject to rain washing. Concentrated solutions have been ineffective even for interior application because their low viscosity did not allow retention of an adequate amount of salts to provide flame retardance. For this latter reason, a formulation is disclosed in the prior art using borax and boric acid in a 2% by weight concentration of an alkali alginate. To brush the alginate-borax-boric acid mixture onto the surface of the wood, sufficient boric acid should be present to prevent the alginate from setting. Similar low-viscosity mixtures of alginate and mono ammonium phosphate were developed; some of these have been used for forest-fire fighting. Low viscosities are essential for spraying or dispersing these mixtures according to prior art and for permitting coalescence of streaky deposits applied by a brush.

Surface applications of fire retardants are now regarded as inadequate for proper protection of processed fibrous materials; integral treatments are deemed essential. Wood may be impregnated with solutions of the fire retardant salts mentioned above but, for several reasons, this is not a feasible means to treat insulation board, paper or many other fibrous materials as will be made apparent from a description of their method of manufacture.

Paper, paperboard and wet process insulation board and hardboard of cellulosic origin are generally prepared from a variety of lignocellulosic plant materials which are reduced to fibers through chemical cooking, grinding cold at atmospheric pressure, grinding in the presence of steam up to 150 p.s.i., using a process in which wood chips are steamed at 1000 p.s.i. and released to atmospheric pressure with explosive force or through employing a combined chemical-mechanical process. The fibers may be washed, refined and treated with sizing materials or other additaments before being formed into a web from a fiber suspension usually consisting of 96 to 99.5% of water.

The web of fibers is formed from this dilute suspension by draining and pressing the water from the fibers on continuous forming machines of the Fourdrinier, Yankee or cylinder type or, in some cases, on batch forming or pulp molding machines. It is not always feasible to reuse the water, commonly called "whitewater" which has been drained or pressed from the forming web; hence dissolved materials, or materials of very small size are lost in this whitewater hereafter referred to as waste water. This loss, during the formation of a wet-laid web, has made difficult or impossible the incorporation of additaments which are quickly dissolved or are of small particle size.

Owing to aforesaid difficulties, the best fire retardants, which in the present embodiment will hereafter be merely referred to as soluble salt, usually have been added after the web has been partially or completely formed and in one of the following ways:

(1) A concentrated solution of the soluble salt has been applied after the bulk of the water has been removed by drainage or pressure; but this surface application before the final press roll is difficult to control in a manner to assure complete penetration of the web without great loss of the soluble salt in the waste water. If applied by pooling or spraying after the last squeeze roll, the penetration of the solution will be non-uniform, the web will be wetter than desired, the web will not handle well, and the water added will have to be evaporated in the drying section of the process.

(2) After the web has been dried, it is possible to re-treat the product by impregnation with a solution of the soluble salt; but this necessitates re-drying with attendent breakage, warping and costly handling of the formed fibrous material.

Despite the above-mentioned difficulties, I have discovered a method for adding the soluble salt to the aqueous suspension of the fibers so as to obtain substantially full retention and uniform distribution in the web formed as described above. Surprisingly, I accomplish this by embedding the water soluble salt into a protective aqueous matrix gel prepared from a hydrophilic material capable of swelling in water or of forming in water a lattice or "brush-heap" structure of substantial shear strength. The embedding can be accomplished simply in a planetary mixer of the Hobart type in which a shearing and kneading action causes the gel to enfold and embed the additament in a matrix which remains in a plastic state; that is, capable of further deformation and spreading under super-atmospheric pressures. No rigid wall is formed around the additaments nor on the surface of the particulate masses.

The gel-embedded soluble salt is then formed into particulate masses by spraying, extruding, mulling, picking or other means. Whether these masses are used in the wet state or are dried and then added to the fiber suspension, I have found that they effectively prevent loss of the soluble salt in the waste water of the wet-forming process, even though the proportion of soluble salt to the total water present is 1 to 5000 or less and the proportion of gelling substance to soluble salt is 1 to 400 or less. I account for this result by the fact that the soluble salt which I employ is largely undissolved within the protective aqueous gel matrix of the relatively large particulate masses and that the time required for it to dissolve and dialyze, or in any other manner to pass from within the gel matrix to the surrounding water of the fiber suspension, is greater than the time required to form the web by draining and pressing off the water ahead of the drying process. Thus the particulate masses of gel-embedded soluble salt may preferably be added at the headbox where the fiber suspension is at its greatest dilution. Within seconds when using a continuous forming machine, or within a few minutes when batch-forming, the water will have been drained and pressed from the fibers and from the particulate masses. Said particulate masses are then entrapped within the fibrous web and move with it toward the drying section.

The final press roll of the wet section is generally adjusted to apply great pressure to the web thereby reducing the moisture content to the range of 50 to 66% by weight. This press roll provides a shearing action within the web which, in my process, causes the particulate masses of gel-embedded soluble salt to be spread thinly and more uniformly throughout said web. By properly adjusting four factors in the production of any gel-embedded soluble salt of this example, I have been able to markedly improve the retention and distribution in the web. The four determinants which greatly affect the retention and distribution are:

(1) *The nature of the aqueous gel.*—I prefer to form the gel from materials which provide maximum viscosity at lowest concentration and cost consistent with adequately retarding solubility of the soluble salt. I select a gel-forming substance compatible with the soluble salt and which has both high hydrating ability and proper molecular size and configuration in the swelled condition. Furthermore, I may select other substances which cross-link these gel-forming molecules so as to further strengthen the aqueous gel matrix. I may also select the gel-forming substance, the soluble salt and/or the cross-linking agent so that these not only provide the desired physical properties of the gel matrix but also serve separate and distinct functions in the dried fibrous product.

(2) *The concentration of the gel-forming material and the proportion of gel to embedded water soluble salt.*—I have found that these factors affecting the consistency, or viscosity, of the gel-embedded soluble salt not only determine the ease of forming the particulate masses but also, and more importantly, they affect the tendency of the particulate masses to undesirably adhere to the fibers, or vice versa, in the dilute suspension prior to web forming. They also affect the freeness of the forming web and they affect the shearing and spreading of the particulate masses under pressure of the press rolls and thereby affect the distribution of the gel-embedded material within the web. It is desirable to adjust the consistency of the particulate masses so that there is essentially no tendency for coalescence of small contacting particulate masses and so that there is a minimum tendency to adhere to fibers as the water is being drained or pressed from the forming web and a minimum tendency to plug the interstices between the fibers to the point of interfering with the drainage of the water. It is also desirable that the consistency, or viscosity, be sufficiently low that substantial shearing and spreading of the particulate masses occur under the super-atmospheric pressure of the press rolls to aid in thinly spreading the gel-embedded additament among the fibers of the web. This spreading of the particulate masses reduces the protective action of the gel matrix by making it so thin that the water remaining in the wet web dissolves the additament and releases it from the gel matrix and causes it to be further distributed in the wet web.

(3) *The adjustment of the specific gravity of the gel-embedded additament.*—Most soluble salts have a density greater than water and would tend to settle out in the headbox or become more concentrated in the lower portion of the web made in a wet-forming process. The incorporation of such high density salts into an aqueous gel which is essentially the same density as water, does not entirely eliminate this tendency to settle and I have sometimes added other additaments of lower density, such as paraffin wax, into the gel, either separate from or as a coating on the surface of the soluble salt, to reduce the specific gravity of the particulate masses of gel-embedded soluble salt. In other embodiments of this invention, I inject or form a gas within the aqueous gel to cause the specific gravity of the particulate masses to become substantially the same as that of water.

(4) *The size of the particulate masses of gel-embedded soluble salt.*—The particulate masses should be of such minimum size that they will not readily drain through the intermeshed fibers on the web forming machine. Particles of about 50 microns and larger are of an effective size for this invention. The maximum useful size of the particulate masses is such that their smallest dimension does not exceed the thickness of the wet web after said web has passed the last wet press section. The particulate masses should preferably be only a fraction of the thickness of said pressed wet web so that there is little or no interference with the intermingling of fibers in the web and so that a minimum of specks, "shiners," voids or other defects appear on the surface of the dried product. Because of this factor, I prefer to apply my process to insulation board, hardboard and similar materials prepared from a thick wet web; though I can also apply it to paper such as "9 point" corrugating medium weighing 26 lbs./1000 sq. ft. or even to less heavy paper sheets. Particulate masses which are large in relation to sheet thickness may be preferred if a decorative or other useful effect is to be obtained thereby. In the production of acoustical materials, for example, large particulate masses containing gel-embedded soluble salt, wax, air, etc., may be used in a manner to produce voids which enhance the acoustical properties of the dried product.

Owing to the great variety of wet-formed products, fiber types, stock freeness values, web thickness and density and intended uses, there are no definite limits to the size, shape or consistency of the particulate masses which I employ. In general, consistencies of the brushed-paint type are not suitable since they are too fluid and sticky; they cause fibers to agglomerate on their surface and, consequently, cause uneven sheet formation; they also tend to disintegrate in water and inadequately protect an additament, or owing to their low gel strength, they are drained off into the waste water; or, if not drained off, they adversely fill the interstices between the fibers of the forming web and prevent water from draining readily from the web. Particulate masses having such low viscosity would easily flow at atmospheric pressure and would tend to coalesce, thereby being unsuitable for my process.

Without being limited thereto, I have found that most aqueous gel-forming materials cannot be used satisfactorily in my process at consistencies which can be sprayed with the usual air sprayer employing 10 to 30 p.s.i. On the other hand, the newer sprayers with air powered reciprocating pumps presently capable of producing nozzle pressures up to 7000 p.s.i. and capable of spraying or extruding viscous or semi-solid materials are very suited to my process. The high pressure sprayers are preferred not alone from the standpoint of handling materials of a wide range of consistencies or viscosities, but also as a means of injecting air into the particulate masses of gel-embedded soluble salt. For example, controlled amounts of air can be introduced at relatively low pressure into the bottom of the pump cylinder and thereafter will be compressed and blended into the aqueous gel at various stepped-up pressure ratios as high as 50 to 1 according to pump design. The gel then will emerge from the spray nozzle as air-entrained particulate masses of gel-embedded soluble salt under pressure up to or exceeding 7000 p.s.i. In the development of such "airless" spray systems, it has been usual practice to diligently avoid the admission of air, since, in contrast to this embodiment of my process, it is usually objectionable to entrain air in viscous sprayed materials.

Another novel aspect of my process is the use of high pressure spraying equipment to form particulate masses under water as, for example, in the headbox of the web-forming machine or in a separate water chest or in a closed water conduit which discharges continuously or batchwise into the web-forming system. The opposing pressure of the water markedly alters the spray pattern after the nozzle; the particulate masses so formed are nonetheless useful in my process. The high pressure sprayer mounted above the headbox or above said separate water chest will cause the sprayed particulate masses to impinge on the surface of the water without adversely affecting the utility of the gel-embedded soluble salt; in fact, the particulate masses are thereby slightly flattened so that they are more readily suspended in the water by virtue of their greater ratio of surface to mass. The flattened masses present a greater area and tend to orient themselves with the water flow, thus facilitating water drainage, resisting passage through the wire of the forming machine and distributing themselves better in the wet web. Despite the greater ratio of surface to mass, the gel matrix prevents excessive loss of the soluble salt.

The most viscous consistency of the particulate masses which I employ cannot be specifically defined owing to the variables encountered in their preparation and use. The "plastic limit," as measured in soil tests (ASTM D424–59), approximates the maximum consistency for the production of particulate masses by means of extruders, such as those used in the plastics and clay products industries. This limit is the consistency at which the aqueous gel is present in the particulate masses in an amount essentially no more that that which permits the mixture to be rolled by the finger tips into a rod shape ⅛ inch in diameter without the rods breaking into pieces.

To form particulate masses of extrudable consistency, I may utilize an auger-type extruder with a nozzle or an extrusion head having a plurality of perforations of suitable diameter, frequently 0.040 inch or less, and with a rotating blade or a reciprocating cutting wire which operates to establish the length of the extruded masses. The blade or cutting wire together with the nozzle may be located under the water of the headbox or under a stream of water flowing to the headbox or to some other suitable place of introduction. If not submerged in water, the cutting blade or wire may be flushed with water to separate the particulate masses and to wash them into the fiber suspension, if this should be required. The ratio of length to diameter of the particulate masses may be varied to suit the needs of the process.

For some purposes and with some additaments, I found that a more solid consistency than that of the aforementioned plastic limit may be desirable and that the crumbling tendency of such a consistency can be used to produce relatively dry particulate masses which may be screened and further manipulated to produce a desirable form of additament. Such crumbled particulate masses, unless the composition is carefully controlled, tend to be excessively dense, to inadequately retard the solubility of the gel-embedded soluble salt, or they tend to resist shear to such an extent as to preclude good distribution of the masses under the super-atmospheric pressure of the press rolls previously described.

It has been found satisfactory to partially or completely dry the particulate masses produced by the spraying, extrusion or crumbling techniques and to feed the dried masses into the headbox where rehydration occurs with a result comparable in effectiveness to that of the undried masses. Owing to the time required to rehydrate completely dried masses of larger particle size, and owing to the short time allowed in the web-forming process between the headbox and final press roll, it is sometimes necessary to install a separate water chest for rehydration of the dried masses, as well as to carefully control the composition and form of the particulate masses, so that they may have the desired shearing propertes when they reach the final wet press rolls.

Whether the undried or dried particulate masses are used in this embodiment, the rate at which they are fed into the fiber suspension should be correlated to the rate of production of the web so as to retain in the finished product the percentage of fire-retarding salt required to produce the desired effect.

After the gel-embedded soluble salt in the web has passed the final press roll, the action of the remaining water, equal to 50 to 66% of the dry fiber, is to dissolve this salt from the now extenuated particulate mass in which thinly spread form solubilization proceeds more rapidly. Solubilization occurs both before and after the web enters the drier section and further improves the distribution of the soluble salt in the fibrous web. Some migration of the soluble salt may occur upon evaporation of the remaining water of the web but the presence of the gel-forming material frequently retards excessive migration. If migration should produce efflorescence, this may either be removed by rubbing, sanding or washing the surface of the dried web, sheet or board representing the finished product or the efflorescence may be smoothed onto the finished product by means of an aqueous application with or without binders and pigments which form a surface coating for the finished product.

In Example 1, described immediately hereafter, my process combines four useful additaments in a gel-embedded fire-retardant formulation. The gel-forming material is the cold-water soluble, methyl ether of cellulose which has the rather unique property of becoming substantially insoluble or non-swelling in hot water. It is an effective binder and its presence integrally in the finished product contributes strength thereto. This gelling material is cross-linked in Example 1 with sodium pentachlorophenate which is especially effective for this purpose and which is widely recognized as a highly efficient fungicide and insecticide. Owing to the retention of sodium pentachlorophenate in the fibrous web, the final product is rendered resistant to the attack of fungi, termites and other destructive biological organisms. The fibrous web, sheet or board is rendered flame-retardant by virtue of the borax embedded within the gel. Finally, the product is rendered waterproof by the paraffin emulsion which is a part of this formulation.

*Example 1*

Using a Hobart mixer for agitation, an aqueous gel was prepared by adding to 300 ml. water, heated to 80° C., 5 grams of the methyl ether of cellulose, sold commercially as Methocel HG4000. While mixing at an intermediate speed of 196 r.p.m., the dispersion was cooled with 250 grams of ice cubes and was diluted to 800 ml., obtaining a thin gel. Next, 10.0 grams of sodium pentachlorophenate dissolved in 100 ml. water were added to the gel under agitation; cross linkage produced a smooth gel of consistency too thick to pour. To this gel was added 100 ml. of a 45% parafin emulsion which caused the gel to lose some of its viscous nature. Then, using mixer at its low speed of 106 r.p.m., powdered borax was mixed into the 1000 ml. of thick gel with the following results:

| Consistency of gel-embedded borax: | Grams borax added |
|---|---|
| Smooth and sticky | 600 |
| Smooth and sticky | 1000 |
| Smooth, heavy paste | 1400 |
| Grainy, good extrusion consistency | 1800 |
| Heavy dough-like consistency; extrudable | 2000 |

The dough-like gel was extruded through a perforated plate having holes 0.040 inch in diameter and the extrusions were cut to particulate masses of ⅛ inch lengths. The viscosity of the particulate masses with either 1,800 or 2,000 grams of borax added was such that the shape of the particulate masses did not substantially deform upon standing and did not coalesce when in contact. When the wet particulate masses made with 2,000 grams of borax were added to water and mechanically stirred, the particles remained suspended as separate entities; a portion of their buoyancy resulted from air which had been entrapped within the gel matrix during the mixing and extruding steps. The water suspending the particulate masses was titrated with acid using phenol red as an indicator to determine the rate at which the borax passed into solution. In this case, 11% dissolved in 14 seconds and approximately 15 minutes were required to completely dissolve all of the borax from the gel. In contrast, a like amount of powdered borax not confined within a gel structure dissolved to the extent of 100% within 10 seconds. In this example, the use of ¼% of methyl cellulose based upon the weight of the borax provided sufficient retardation of solubility for the purpose of this invention. This percentage of gel-forming material is not suggested as being a minimum.

*Example 2*

150 grams of 10% polyvinyl alcohol (Elvanol 52–22) were diluted with 450 ml. of water before adding 100 ml. of saturated solution of borax which caused the polyvinyl alcohol to cross-link and to form a rubbery gel into which 650 grams of powdered borax were mixed. Particulate masses were extruded and dried after which solubility tests, conducted as in Example 1, showed that 8.5% of the borax dissolved in 24 seconds and that 59 minutes were required for complete solution of the borax.

*Example 3*

10 grams of sodium alginate mixed into 490 grams of hot water produced a thin gel into which 1000 grams of powdered mono-ammonium phosphate were mixed. Particulate masses of this preparation were formed and briefly immersed in a cold solution of a soluble calcium salt to form a superficial coating of insoluble calcium alginate on the exterior surface of the particulate masses. This treatment effectively retarded the rate at which the mono-ammonium phosphate dissolved in water.

*Example 4*

A 1.5% fiber suspension was made using commercially produced ground wood pulp into which was mixed particulate masses of gel-embedded borax in an amount providing borax equivalent to 14% by weight of the dry fibers. The particulate masses corresponded to those of Example 1 with the exception that the paraffin emulsion had not been added. The suspending water was removed through a screen and the web of fiber had particulate masses uniformly distributed throughout. The wet web was transferred to a cold press where it was pressed at super-atmospheric pressure to a moisture content of 65%. Examination of the web indicated that the pressure had caused the particulate masses to shear and to spread to such an extent that their presence as discrete particles was not noticeable. The felt was dried at 280° F. to produce a dry board the same density as the rigid wood-fiber insulation board produced commercially and commonly used for construction purposes and acoustical correction. Care was taken to lower the temperature during the last stage of drying so that the borax would not excessively lose water of hydration.

The board was stronger than expected owing to the presence of the methyl cellulose acting as a binder; it was resistant ot mold, fungi and insects owing to the borax and sodium pentachlorophenate retained. Significantly, the methyl cellulose of the gel was insolubilized by the heat of the drier but this apparently occured after the borax in the gel had been dissolved and distributed in the board. When subjected to a standard flame test, the board treated with the borax was found to be substantially flame resistant.

B. ADDITAMENTS COMPRISING A GEL-EMBEDDED RESIN

In the manufacture of fibrous products of the wet-formed type described in "A" above, and in making similar finished products by dry forming, it is frequently necessary to add resins having thermosetting or thermoplastic properties. Such resins may be added to the fiber in the defibrating process, added to the water suspension of fibers in the wet process, or added to the air suspension of fibers in the "dry process" for forming webs, mats, sheets or boards of fibrous material. Upon being properly heated, with or without applied pressure, the resin converts or softens in a manner causing adjacent fibers to become bonded together.

While the principal purpose of adding resins has been that of increasing the strength and dimensional stability of fibrous materials, a kindred but seemingly distinct function which resins may perform is that of stiffening the product. It has been found by the United States Forest Products Laboratory that fiber containers made from corrugated box board may have adequate compression strength at room temperature and 50% relative humidity (R.H.) but a few days at 90% R.H. causes the box to lose strength to such an extent that it is not serviceable For example, at 90% R.H. the corrugating medium may lose 47% of its 50% R.H. strength in the machine direction or 54% of its 50% R.H. strength in the direction across the machine. The liner board similarly may weaken at 90% R.H. to 37% of its 50% R.H. strength. It is possible to provide the required handling strength at 90% R.H. by increasing the liner board to a basic weight of 69 lb./1000 square feet instead of the standard 42 lb. weight, but this adds to the total shipping weight of the container and is not so economic as the addition of a resin. A 42 lb. liner containing 8% of phenol formaldehyde resin will have the same strength at 90% R.H. as an untreated box made from 69 lb. liner.

It has been proposed to add phenol formaldehyde resin ahead of the fan pump before forming the web, in which case it is precipitated onto the fibers using an acid-alum solution; or it may be added to the web containing 65% water at the smoothing press; or, preferably, it is added at the size press where the water content is only 15%. Attempts to add 5% phenolic resin in the pulp with a second treatment applying 2.5% at the size press did not result in so good strength as 5.9% resin applied only at the size press. When more than 10% resin is applied by any prior art the board is made brittle. Embrittlement presents fabrication problems at the time of scoring the fold lines and causes loss of folding endurance; with 15% phenol formaldehyde resin, the fold endurance was one double fold compared to 380 for untreated liner.

Hydrocarbon resins have also been applied to corrugated medium and to liners as integral treatments or as size press treatments giving total or partial penetration of the web. Again, more than 15% resin applied integrally or on the surface results in embrittlement and loss of fold endurance. Also, this type and quantity of resin, particularly if applied as a surface hot melt before gluing, interferes with the gluing operation on the corrugator.

I have found a simple method of applying resins, including the low-cost hydrocarbon type, in such a manner that larger quantities of resins may be applied to the corrugating medium and liner thereby providing a desirable increase in stiffening without the previous trouble with scoring or an excessive loss of folding endurance. This is accomplished without interfering with the normal use of aqueous type adhesives such as sodium silicate or starch and therefore represents the first adequate solution to stiffening fiber containers of the corrugated type.

In this embodiment of my invention, I may use any thermosetting resin of the aldehyde reacting type or any thermoplastic resin including a wood resin with a softening point of 234° F. (ASTM ball and ring method) known commercially as Vinsol, but I may also use petroleum hydrocarbon resins having a softening point above 158° F. such as the resins disclosed in the United States Patents 1,836,629; 2,039,365; 2,569,595 and 2,891,933 or in Canadian Patent 531,202 dated October 2, 1956. These resins are of the types obtained from a deep-cracked petroleum stream, or from a Gray Tower stream, by polymerizing the unsaturated portions with aluminum chloride; and they include the inter-reaction of this resin with the usual vegetable and animal drying oils or synthetic unsaturated compounds used in drying oils. These resins may be light colored, as claimed in the patents mentioned above, or they may be cruder and dark in color.

In addition, my invention may be used with natural gums, sulfur pitches and asphalts or modifications of these which provide a softening point above 100° F.

While in this embodiment I may add up to 15% of the resin at the beater, or at another location such as the fan pump, in advance of the formation of the web of either the corrugating medium or the line, and while this additament may consist of a powder, an emulsion or any other dispersion, and while its use in these forms may include acid-alum precipitation, co-precipitation with rosin size or paraffin size, etc., I prefer to add it as a gel-embedded resin. Using techniques and quantities described under "A" above, I obtain particulate masses with finely powdered resin substituted for borax. These particulate masses of gel-embedded resin are then incorporated in the forming web so as to retain approximately 4 to 10% resin by dry weight of the web. The super-atmospheric pressure of the press rolls of the paper machine distributes the gel and resin throughout the web and the heat of the drying rolls insolubilizes the methyl ether of cellulose thereby releasing the resin and the heat also softens the resin causing it to surround or bridge, and partially penetrate, the fibers. I am careful not to add so much resin at this point as to interfere with the gluing of the medium and liner when forming the container board. About 5% resin is a generally suitable amount.

Having integrally incorporated about 5% resin into the container board liner and/or medium, without excessive embrittlement thereof, and having glued these to form a container board, I proceed to score this dry board and may even print on it. Before or after printing, additional resin, either diluted with a solvent or softened by heat, is applied to the dry and scored board by hard coating rolls or other suitable means which will assure that resin is not transferred into the deeply scored portions of the container board. With adjustment of the concentration in the case of solvent dilution or of the temperature and viscosity of the hot melt, it is possible to apply controlled amounts of resin on the outer surfaces of the dry board. This control can usually provide adequate surface penetration but, if desired, the coated container board may itself be heated to obtain deeper penetration.

When applying 7½% of resin to the faces of the container, except at the scores, the finished container will have liners stiffened with substantially 12½% of their weight of resin and it will have 5% resin stiffening the medium while obviating gluing difficulties on the corrugator and while retaining adequate fold endurance. Larger or smaller amounts of resin can be applied in either of the two treatments depending on the characteristics desired for the container board.

By predominantly localizing the resin on the outer faces of the container board, a "skin effect" is produced which is well known to provide maximum stiffness and compressive strength. When using low-cost hydrocarbon resins, this "skin effect," with or without being augmented by the integral stiffening treatment of the liner and/or medium, results in higher strength at 90% R.H. than can be obtained at much higher cost by either increasing the fiber in the liners or by using the more expensive phenol formaldehyde resins. Goods packed in these stiffened boxes can be stacked higher and subjected to more severe conditions of storage than has been possible with the prior art. The integral resin treatment of the fibers in the scores contributes strength in this area without excessively reducing fold endurance.

In another embodiment of my invention, I apply the resin to the surface of a formed container board in two or more coats. When using container board made from liner which is not integrally treated, I first apply 1 to 10% of resin by weight of the liner onto the full surface of each side of the container board. The resin can be in the form of a powder, solution or hot melt and it can be applied by dusting, spraying, dipping, transfer coating or by any other suitable means. Next I score the board preferably in a manner to cause indentations on both sides of the container board. Then I apply one or more surface coatings of any desired weight using hardened coating rolls, or other suitable means, without adding resin to the scored areas which are stiffened by the first coat only. The resulting container board is strengthened at the scores without becoming frangible thereat; and it has faces stiffened to a degree not possible in the prior art without causing failures in the process of scoring and folding.

The present invention is adaptible to the manufacture of dry process particle board, hardboard, or other products by using hydrophilic or hydrophobic gels containing either water soluble or water insoluble binders and other additaments. In the dry process, the organic or inorganic fibers, chips, or flakes, are usually blown by a gas stream, which is most often air or steam, into a substantially closed chamber wherein they settle to form a mat on a movable belt or tray which carries the mat to a thickness regulating means and a thickness reducing roll or press prior to being subjected to a final super-atmospheric pressure which may be applied by either a heated or unheated press. The particulate masses of this invention can be introduced into the gaseous suspension of fibers, chips, or flakes, without adhering thereto and causing their agglomeration prior to disposition in a mat and without adversely affecting their redistribution in the gas stream if picked from the mat by the thickness regulating means. The subsequent application of super-atmospheric pressure shears and thinly spreads the particulate masses thereby releasing and distributing the additament so that it may serve its intended purpose. It may be necessary, in some instances, to heat the board after pressing in order to complete the thermal or the oxidative setting of the resin. Procedures for doing this are identical to those commonly employed in the production of tempered hardboard.

To produce a hardboard which is exceptionally resistant to indentation and more suitable for floor coverings, I have found that a hydrophobic gel-forming material of the amine-treated Bentonite type is useful in my process. Following the general process of Behr as described in U.S. Patent 2,904,467, I substitute for the petroleum solvent a liquid unsaturated petroleum polymer fraction such as Panapol 1537 produced by Amoco Chemicals Corporation from a deep-cracking process or CTLA produced by Enjay Chemical Corporation from the Gray Process for cracking. I may also substitute a vegetable drying oil though I prefer a mixture of 50 to 85% petroleum polymer and 50 to 15% of vegetable drying oil or tall oil.

To the preceding formulation I may add a powdered resin prepared by reacting these petroleum polymers with aluminum chloride catalyst or a copolymer as described above or a copolymer resin from said petroleum polymer and tall oil. Other modifications may be made such as varying the amounts of an added toxicant, such as pentachlorophenol, and varying the viscosity. The Behr formulation provides a grease which is sufficiently tacky to be undesirable in either the wet or dry process unless the outside of the particulate masses are dusted with a material such as aluminum stearate, clay, talc and the like, which reduces this tackiness. I prefer to increase the solids content either by the addition of resins, fire-retardant products, clay or an additional amount of the amine-treated Bentonite so that the particulate masses produced from this mixture loses its tacky character but retains the ability to shear under the pressure of a press roll or under the pressure of the heated platens in the hardboard press.

It is preferred, but not essential, in the manufacture of hardboards, that the fibers of the wet felt, or a dry-formed mat, should have more than 6% of water when they are pressed in a heated press with a wire screen on one side of the felt or mat. The amount of gel-embedded binder which I add in this process may vary upwards from 0.5% to 25% of the dry weight of the final product. The boards can then be pressed at the normal super-atmospheric pressures, temperatures and press cycles used for manufacturing hardboards. A suitable product results from pressing for 7 minutes at 1000 p.s.i. between platens heated to about 230° C. The hardboard thus formed may be improved by heating it in the presence of air at approximately 150–160° C. for a period of 2 to 8 hours depending upon the thickness of the board, the nature of the binders and the quality desired for the product. The dense clay-filled product thus produced is highly resistant to indentation.

C. ADDITAMENTS COMPRISING A GEL-EMBEDDED TOXICANT

The prior art of incorporating toxicants in products formed from an aqueous suspension of fibers has been to add the toxicant as a solid, liquid or emulsion and to cause its retention in the forming web by direct mechanical entrapment or by coagulation or affixation on the fiber with acid, alum, or other precipitants. In some cases, as with the so-called copper pentachlorophenate, the precipitate is sometimes produced outside of the system and is added to the fiber suspension as a slurry. This method has not been altogether satisfactory as evidenced by the loss of the toxicant in the waste water and by an unexpected low toxicity at other times when proper amounts, as indicated by chemical analysis, are retained in the product.

The anomalous results can be accounted for with the theory that if the reaction product resulting from mixing solutions of copper sulfate and of sodium pentachlorophenate is in too hydrous a state it will not have adequate strength to resist the drainage of the water from the web and will be carried away in the waste water. On the other hand, if the precipitate from this reaction is allowed to age and undergo partial dehydration, the particle size of the toxicant will become so large that it is readily retained in the web, and is determinable by chemical analysis, but it is so poorly distributed in the final product that it is unable to provide the expected degree of protection. I have now found a means to distribute the toxicant in the final product in a manner which enhances its toxicity and distribution by maintaining a fine particle size and yet which prevents the loss of these fine particles in the white water.

It is well known that protective colloids may be used when precipitating insoluble materials and that these prevent or delay the agglomeration of the precipitate so as to maintain it as discrete particles of colloidal size in colloidal suspension. Cellulose waste liquor, natural gums, starches, proteins and synthetic substances of the type of ethers of polysaccharides provide protective action for peptizing or preventing agglomeration of the minute toxicant particles. The addition of such colloidal suspensions to an aqueous system results in dissolution of the suspension and in a wet web-forming process much of the colloidal component will be lost in the waste water.

In the present embodiment of the gel-embedded additament of my invention, I may produce insoluble colloidal precipitates of toxic nature within the gel or I may embed therein water soluble salts. The quantities of these materials required as toxicants is generally much smaller than the quantities of chemicals required for developing water resistance, increased strength or fire retardance. Consequently, the toxicant alone is sometimes inadequate to produce the viscous, substantially non-tacky nature of my gel-embedded additament in sufficient quantity to assure its uniform distribution in the web when minor quantities of hydrophilic gel-forming materials are used as in the previous examples. It is possible under such circumstances to use a greater amount and concentration of the gel-forming material. Alternatively, through combining it with an inert diluent, such as clay, it is possible to produce the desired viscosity, but I prefer to combine it with other desirable additaments such as binders, waterproofing agents, fire retardants, fillers, pigments and the like.

It is known that 0.8% of pentachlorophenol will preserve wood fibers against fungi and insects; but to treat 100 grams of fiber with only 1.8 grams or less of gel-embeded toxicant does not provide the maximum protective action from the toxicant since it may not be completely distributed on or between the fibers. When, as an example, this amount of pentachlorophenol is blended with 6 grams of powdered hydrocarbon resin of the type mentioned above, 15 grams of powdered chlorinated paraffin having approximately 70% chlorine content, and 3 grams of the liquid glow-retardant, triphenyl phosphate, and when this blend is embedded into a gel to a consistency specified in this invention, the volume of the gel in relation to the fiber mass will be more than adequate to provide good distribution of the additaments under the shearing action of the final press roll.

With the above formulation, it was also found possible to reduce the deleterious effect of the instability of chlorinated paraffin. Under the influence of heat and light, the chlorinated paraffins are known to release a portion of their chlorine which then attacks the cellulose with which it is in contact. By having the hydrocarbon resin present in the extent of 6% of the weight of the wood fiber, it has been found that not only does the resin provide marked increase in strength but it also retards the deleterious action of chlorine released from unstable products such as chlorinated paraffin. A possible explanation for this lies in the nature of the hydrocarbon resins which contain a moderate degree of unsaturation and therefore act as receptors for the chlorine and convert it to a more stable compound harmless to the fibers.

As another example, my gel-embedded toxicant may be made as an insoluble colloidal precipitate formed in situ. To accomplish this, I mix sodium pentachlorophenate, sodium orthophenyl phenate, or other soluble toxic salts into one portion of the gel and into a second portion of the gel, which may be formed from a different hydrophilic gel-forming substance in which it is more stable, I may add copper sulfate. By mixing the two gel portions, I produce a non-homogeneous gel matrix and cause the formation of sodium sulfate with the simultaneous production of pentachlorophenol and hydrous copper oxide; the latter two are effective toxicants. The pentachlorophenol and the hydrous copper oxide so produced are of such small particle size as to possess their maximum toxic action which, in the intimate but non-homogeneous mixture made by my process, exceeds that of the "copper pentachlorophenate" produced by the prior art. The gel which embedded these toxicants may be used with good effect at low viscosities and in a "tacky" state if it is not added to an aqueous medium but where it is to be added to a wet-process web, the gel of low viscosity will retard drainage of water. Therefore I sometimes prefer to incorporate other additaments to raise the viscosity to the preferred range as previously described.

Through precipitating the copper within a gel matrix, through forming particulate masses which are added to the aqueous suspension of fibers and through retaining these particulate masses in the web, there is minimal loss of copper in the waste water. In the prior art the copper has been appreciably redissolved in the water of the fiber suspension which is usually adjusted to pH 4.5 as a means for precipitating waterproofing agents such as rosin size, paraffin emulsion and the like. Embedding the toxicants in the protective gel matrix not only assures a more effective size for the copper precipitate and better retention in the product, thereby providing a means for reducing toxicant costs, but, equally important, it greatly reduces or eliminates the prior art problem of stream pollution by toxicants lost into the waste water.

In the preceding example of the formulation of a double toxicant in gel matrices, a process for preparation has been disclosed which need not be limited to double precipitations. The gel matrix in which copper sulfate exists may be subjected to an alkaline reactant which does not adversely affect the gel matrix but which precipitates therein the copper. This cooper containing matrix may then be used either within my process by particulating it and using it in combination with a shearing and spreading means or it may be used in other processes wherein the virtue of the gel matrix is that of preventing agglomeration of the precipitated copper. Similarly sodium pentachlorophenate within a gel matrix can be subjected to an acidic reactant which causes the precipitation of pentachlorophenol in a finely divided form which is prevented from agglomerating by being within the gel matrix and this product may be used in connection with my shearing and spreading process or in other processes in which a toxicant is required.

D. GEL-EMBEDDED ADDITAMENTS IN GENERAL

In the application of my invention, I furthermore have found it desirable to use gel-embedded additaments in particulate masses of substantially non-tacky consistency. This limitation relates to the consistency only at the time that it is added to the fiber suspension. It is expected that the gel will begin a gradual dissolution and will lose most of its protective action after being thinly spread by the applied super-atmospheric pressure but this dissolution should not proceed to the extent of material interference with water drainage from the web prior to the pressure application. It is within the scope of my invention to confine the additaments within a thixotropic gel which becomes highly fluid under super-atmospheric pressure used to remove water from the web. Likewise, the additaments may be embedded within a gel possessing greater viscosity or lower tackiness on the exterior of the particulate mass than is possessed by the same gel substance in the interior. In one form of my invention, the particulate masses may be dusted or otherwise treated on the exterior surface with anti-stickiness agents which may also be waterproofing agents, such as aluminum stearate, zinc stearate, talc, and the like. Moreover, it is apparent that the gel may be of such type that it rapidly loses its viscosity as the temperature of the web rises in the drier section. In addition to the release of additaments by solvation of the thinly spread gel matrix, direct exposure of the additament may result during the shearing and spreading of the particulate masses. Moreover, the drying of the gel matrix alters its protective characteristics. In some cases, the higher temperature of a drier causes the hydrophilic colloid to become essentially insoluble whereupon the gel "breaks" or contracts so as to release the additament. In other cases, the gel might dry around the additament but contract in the process thereof and expose the additament. In yet another instance, the dry residue of the gel might become porous and permit additaments of a liquid, or liquified, nature to pass through the pores. This invention is not restricted by the manner in which the release of the additament is accomplished.

To more clearly indicate the broad scope of the additaments which may be incorporated into fibrous masses by means of my invention, the following are listed as general examples without limiting my invention thereto:

(1) *Gel-forming substances of the hydrophilic type.*— Natural gums of the type of gum arabic, guar, karaya, locust bean, etc. and their chemical derivatives; galactomannans; starches, dextrines and their modifications; alginates; Irish moss; gelatine; animal glue; soaps; alkali metal silicates; cellulose ethers; sodium carboxymethylcellulose; polyvinyl alcohol; polyvinyl acetates; and the like.

(2) *Gel-forming substances operative in hydrophobic systems.*—Petrolatum and petroleum greases; compositions of the class of organic ammonium montmorillonites and similar substances; aluminum stearate; and the like.

(3) *Fire-retardant substances.*—The boron types such as borax, boric acid, Kernite, Colemanite, zinc borate; ammonium salts such as the sulfate, sulfamate, phosphates, etc.; phosphoric acid; tricresyl phosphate, triphenyl phosphate and other neutral tertiary esters of phosphoric acid with ester linkages to aryl, alkyl substituted aryl and saturated chlorinated and brominated alkyl groups; phosphates of such compounds as guanidine, dicyandiamide, melamine and the like; paraffin, naphthalene or biphenyl halogenated to 30–70% halogen by weight; halogenated vegetable or fish oils; halogenated vinyl resins; metallic oxides, chlorides and sulfides of antimony, tin, arsenic, bismuth, zinc and aluminum; and the like.

(4) *Resins and binders.*—Glues; gums; starches; casein and other proteinaceous substances; asphalt; coal tar products; petroleum resins including unpolymerized and unsaturated liquid fractions from the cracking of petroleum; drying oils of vegetable or animal origin such as soya bean oil, tung oil, tall oil, fish oil, etc.; aldehyde resins from reactions including phenol, urea, resorcinol, dicyandiamide, protein, etc.; polystyrene, polyethylene, polyisobutylene, butadiene-styrene and their copolymers; rubber and other elastomers; alkyd resins; soya flour; wood pitch low in abietic acid; and the like.

(5) *Toxicants serving as fungicides, mycosides or insecticides.*—Halogenated phenols and their alkali metal salts; substituted phenolics such as chloro ortho phenyl phenol; soluble copper, zinc, nickel and mercury salts such as sulfates, chlorides, fluorides, chromates, arsenates and arsenites; copper or zinc ammonium salts; copper naphthenate or copper 8 quinolinolate; beta naphthol; subdivided metals such as copper or zinc; and the like.

(6) *Humectants and dimension stabilizing compounds.*—Sugars; sorbitol; polyethylene glycol; calcium chloride; and the like.

(7) *Waterproofing materials.*—Paraffin; bitumens; wood rosin; metallic salts or stearic, oleic and other fatty acids.

(8) *Inorganic filling or coloring materials.*—Clays; diatomaceous earth; calcium carbonate; talc; magnesium oxide; titanium dioxide; pigment colors; dyestuffs; and the like.

The foregoing additaments and combinations thereof may be utilized in my process when combined into gel-embedded particulate masses added to a fibrous web, sheet or board. Studies have established that particulate masses of these gel-embedded additaments may not only be added to wet processes such as the formation of paper and linerboard, wallboards and the like, but they may advantageously be used in fiber moulding processes and for the production of particle boards by the dry process wherein pressure is applied to the formed mat, sheet or board. The process may even be applied to treat textile threads, yarns, ropes, cords, and felted or woven fabrics. Similarly it may be employed with inorganic fibers; leather fibers; plastic fibers; and the like.

From the foregoing examples of additaments, it will be apparent that the present invention is capable of application to a large field of commercial and industrial applications as it enhances the properties of fibrous materials in general and cellulosic products in particular. It is significant that in my process the deposition of the various additaments can most frequently be accomplished through a single means quite independent of many process variables which have caused unsatisfactory deposition or retention by other means. Furthermore in the single process of my invention various additaments are incorporated in the product which in the prior art would require several separate treatment processes. To combine such treatments into the one of my process, it is only essential that mutually compatible substances are used and that they do not adversely affect the gel structure in which they are confined.

The embodiments of the invention in which an exclusive property or privilege is claimed are defined as follows. What is claimed is:

1. An improved process for distributing an additament in a fibrous product which comprises the steps of:
   (a) preparing a suspension of fibers,
   (b) adding to said suspension of fibers a plurality of particles consisting of additament embedded in a protective matrix of a high viscosity gel, said particles being at least 50 microns in size, said gel viscosity being sufficient to retard liberation of the additament during the formation of the fibrous product and wherein said particles resist contact coalescence except under super-atmospheric pressure.
   (c) forming a web containing said particles without substantially distorting their shape,
   (d) thereafter subjecting the web to super-atmospheric pressure to shear and spread said particles so as to greatly increase their surface area, to reduce the protective action of the high viscosity gel, which until this step has retarded the liberation of the additament, and to more widely distribute the additament.

2. An improved process according to claim 1 wherein said suspension of fibers is an aqueous suspension, and said web containing said additament is dried.

3. An improved process according to claim 1 wherein said suspension of fibers is a gaseous suspension.

4. The process according to claim 1 wherein said high viscosity gel is an aqueous dispersion of a hydrophilic material and wherein said high viscosity gel containing additament is heated to separate water from said hydrophilic material.

5. The process according to claim 1 wherein said high viscosity gel is formed from a first component cross-linked with a second component.

6. The process according to claim 1 wherein said particles are surface-treated prior to step (c) with a material which reduces tackiness of the exterior surface.

7. The process according to claim 1 wherein said additament is a solid water soluble salt finely dispersed within the high viscosity gel to retard the solubilization of said salt prior to step (d).

8. The process according to claim 1 in which the finely dispersed material is a borate and the gel structure consists of a water-soluble cellulose ether cross-linked with sodium pentachlorophenate.

9. The process according to claim 1 wherein said particles are formed by the following steps:
 (a) forming a first gel matrix,
 (b) mixing into said first gel a first reactant compatible therewith,
 (c) forming a second gel matrix compatible with said first gel and said first reactant,
 (d) mixing into said second gel a second reactant reactive with said first reactant and compatible with said second gel,
 (e) mixing said first and second gels containing reactants to react said first and second reactants while retaining within said mixture of first and second gels precipitated reaction products,
 (f) particulating said mixture of first and second gels containing reaction products.

10. The process according to claim 1 wherein a plurality of additaments are embedded within at least one high viscosity gel that is thereafter particulated to form said particles.

References Cited by the Examiner

UNITED STATES PATENTS

| | | | |
|---|---|---|---|
| 2,402,469 | 6/1946 | Toland et al. | 162—168 |
| 2,849,316 | 8/1958 | Lauring | 162—159 |
| 2,939,009 | 5/1960 | Tien | 117—36.1 |
| 3,015,603 | 1/1962 | Hawley | 162—117 |
| 3,049,471 | 8/1962 | Behr | 167—38.7 |
| 3,137,631 | 6/1964 | Soloway | 252—316 |

FOREIGN PATENTS 627,590 9/1961 Great Britain.

DONALL H. SYLVESTER, *Primary Examiner.*
S. LEON BASHORE, Jr., *Examiner.*